United States Patent
Sommerville

(10) Patent No.: US 7,873,135 B2
(45) Date of Patent: Jan. 18, 2011

(54) METHOD AND APPARATUS FOR MITIGATING VIBRATION IN A NUCLEAR REACTOR COMPONENT

(75) Inventor: Daniel Verne Sommerville, Santa Cruz, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/385,745

(22) Filed: Apr. 17, 2009

(65) Prior Publication Data

US 2009/0245452 A1   Oct. 1, 2009

Related U.S. Application Data

(62) Division of application No. 10/879,065, filed on Jun. 30, 2004, now abandoned.

(51) Int. Cl.
*G21C 7/00* (2006.01)

(52) U.S. Cl. .................................... 376/277; 376/245

(58) Field of Classification Search ............... 376/277, 376/245
See application file for complete search history.

(56) References Cited

U.S. PATENT DOCUMENTS

| | | |
|---|---|---|
| 4,624,435 A | 11/1986 | Freudenberg |
| 4,899,996 A | 2/1990 | Maassen et al. |
| 5,236,186 A | 8/1993 | Weltin et al. |
| 5,397,949 A | 3/1995 | Guardiani et al. |
| 5,427,362 A | 6/1995 | Schilling et al. |
| 5,740,216 A | 4/1998 | Morishita |
| 5,896,076 A | 4/1999 | Van Namen |
| 5,913,392 A | 6/1999 | Eckel et al. |
| 6,009,985 A | 1/2000 | Ivers |
| 6,196,529 B1 | 3/2001 | Shtarkman et al. |
| 6,505,718 B2 | 1/2003 | Fujita et al. |
| 6,565,072 B2 | 5/2003 | Goto et al. |
| 6,588,554 B2 | 7/2003 | Fujita et al. |
| 6,600,283 B1 * | 7/2003 | Platti ........................ 318/460 |
| 6,857,625 B2 | 2/2005 | Loser et al. |

FOREIGN PATENT DOCUMENTS

| | | |
|---|---|---|
| JP | 54 119735 A | 9/1979 |
| JP | 62-228196 A | 10/1987 |
| JP | 57 137737 A | 8/1992 |
| JP | 05-027384 | 4/1993 |
| JP | 05 248490 A | 9/1993 |
| JP | 11-153184 | 6/1999 |
| JP | 2002 370563 A | 12/2002 |

OTHER PUBLICATIONS

Foreign Search Report dated Nov. 24, 2005.
Japanese Office Action dated Mar. 2, 2010 for Japanese Application No. 2005-189091.

* cited by examiner

*Primary Examiner*—Rick Palabrica
(74) *Attorney, Agent, or Firm*—Harness, Dickey & Pierce, P.L.C.

(57) ABSTRACT

A device is provided for mitigating vibration in a component of a nuclear reactor by removing vibration energy. To reduce vibration in the component, a device operatively connected to the component and including a magnet may be actuated within a conductive cylinder. This actuation may generate one or more eddy currents providing a damping function for removing vibration energy from the component, so as to alter vibration characteristics of the component.

10 Claims, 5 Drawing Sheets

METHOD AND APPARATUS FOR MITIGATING VIBRATION IN A NUCLEAR REACTOR COMPONENT

CROSS-REFERENCE TO RELATED APPLICATIONS

This application is a divisional of U.S. patent application Ser. No. 10/879,065 filed on Jul. 30, 2004 now abandoned. The disclosure of the above application is incorporated herein by reference in its entirety.

BACKGROUND OF THE INVENTION

1. Field of the Invention

The present invention relates generally to a vibration mitigation device for a nuclear reactor component, and to a method of mitigating vibration in a nuclear component.

2. Description of the Related Art

Boiling water reactors (BWRs) have emerged as a reliable type of nuclear reactor for producing electrical energy. However, some BWRs have experienced cracking in various components of the BWR. One contributing factor to component cracking in a BWR may be due to high cycle fatigue. Typically, a BWR may operate from about one to two years on a single core loading of fuel. Upon completion of a given period (known as an energy cycle or fuel cycle), approximately ¼ to ½ of the least reactive fuel (oldest or most burnt) may be discharged from the reactor. The number of cycles which may constitute a substantially high number of cycles may vary from BWR to BWR, as other factors may affect cycle time, such as design, operating conditions, etc.

High cycle fatigue may be caused, for example, by a substantially high acoustic frequency vibration, for example a frequency above 100 Hz, and/or a substantially low acoustic frequency vibration, for example a frequency below 100 Hz. It should be understood that the frequency which constitutes a high and/or a low acoustic frequency may vary based on the application. The amplitude of a vibration in a BWR may directly influence or exacerbate high cycle fatigue, which in turn may cause the cracking of a component of the BWR. The amplitude of the vibration in the BWR experienced by a component of the BWR may be directly proportional to the stress in the component. High amplitude of the vibration in the BWR may lead to a high stress level, which may cause the cracking of a component of the BWR.

FIG. 1 is a cut-away to illustrate an upper portion of a conventional reactor pressure vessel (RPV) of a BWR. Typically, and referring to FIG. 1, a BWR may include an upstanding reactor pressure vessel 10 which incorporates a lower reactor core structure beneath which are control rod drive mechanisms (not shown for clarity). Above the core may be a steam separator assembly 25 and a steam dryer assembly 30 leading to a steam outlet 35. One or more reactor components of the steam separator assembly 25 or steam dryer assembly 30 may experience vibration due to increased vibration amplitude due to the stresses from the aforementioned high cycle fatigue. This may accelerate cracking of the reactor component.

SUMMARY OF THE INVENTION

An exemplary embodiment of the present invention is directed to a device for mitigating vibration in a component in a nuclear reactor. The device may include a spring mechanism and a mass attached to the spring mechanism. The spring mechanism and mass may be in operative engagement with each other so as to reduce vibration effects in the component.

Another exemplary embodiment of the present invention is directed to a method of reducing vibration in a component within a nuclear reactor. A device operatively connected to the component and including a magnet and conductive cylinder, may be actuated. This actuation may generate one or more eddy currents providing a damping function for removing vibration energy from the component.

BRIEF DESCRIPTION OF THE DRAWINGS

The exemplary embodiments of the present invention will become more fully understood from the detailed description given herein below and the accompanying drawings which are given by way of illustration only, wherein like reference numerals designate corresponding parts in the various drawings.

DETAILED DESCRIPTION OF THE EXEMPLARY EMBODIMENTS

Figure 2A:
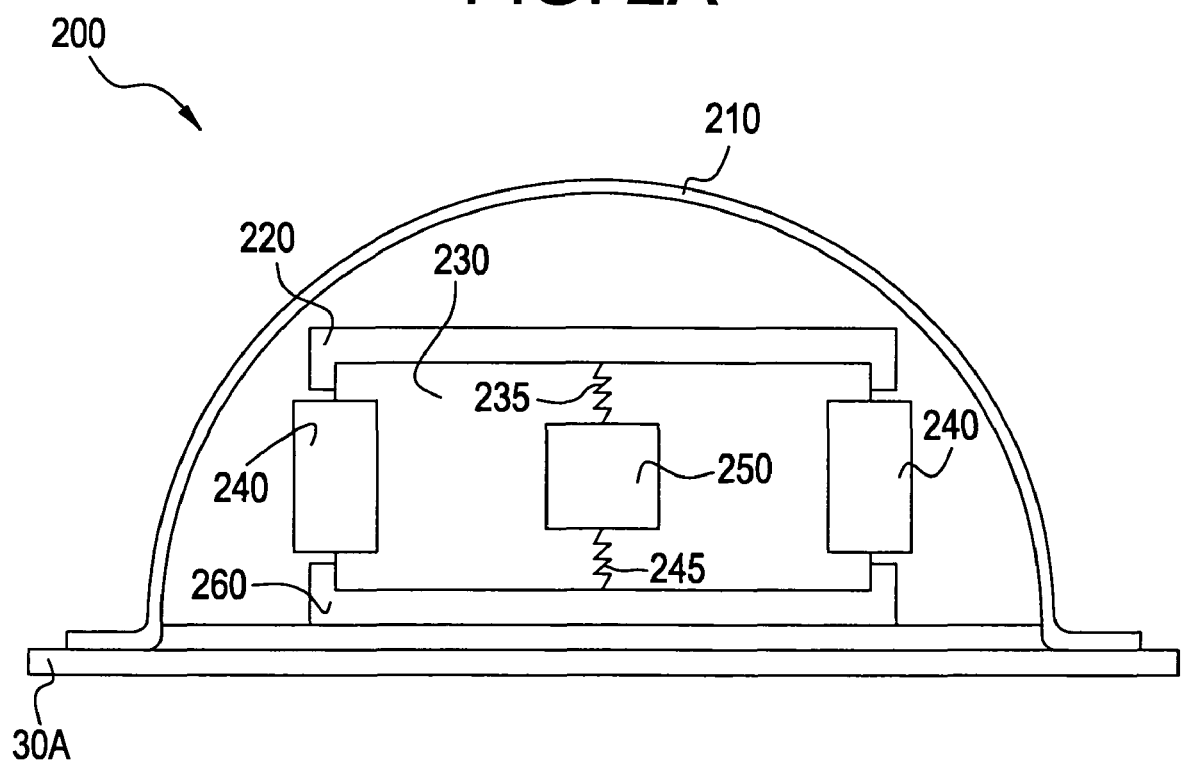
FIGS. 2A and 2B illustrates a vibration mitigation device (VMD) according to an exemplary embodiment of the present invention.
Figure 2B:
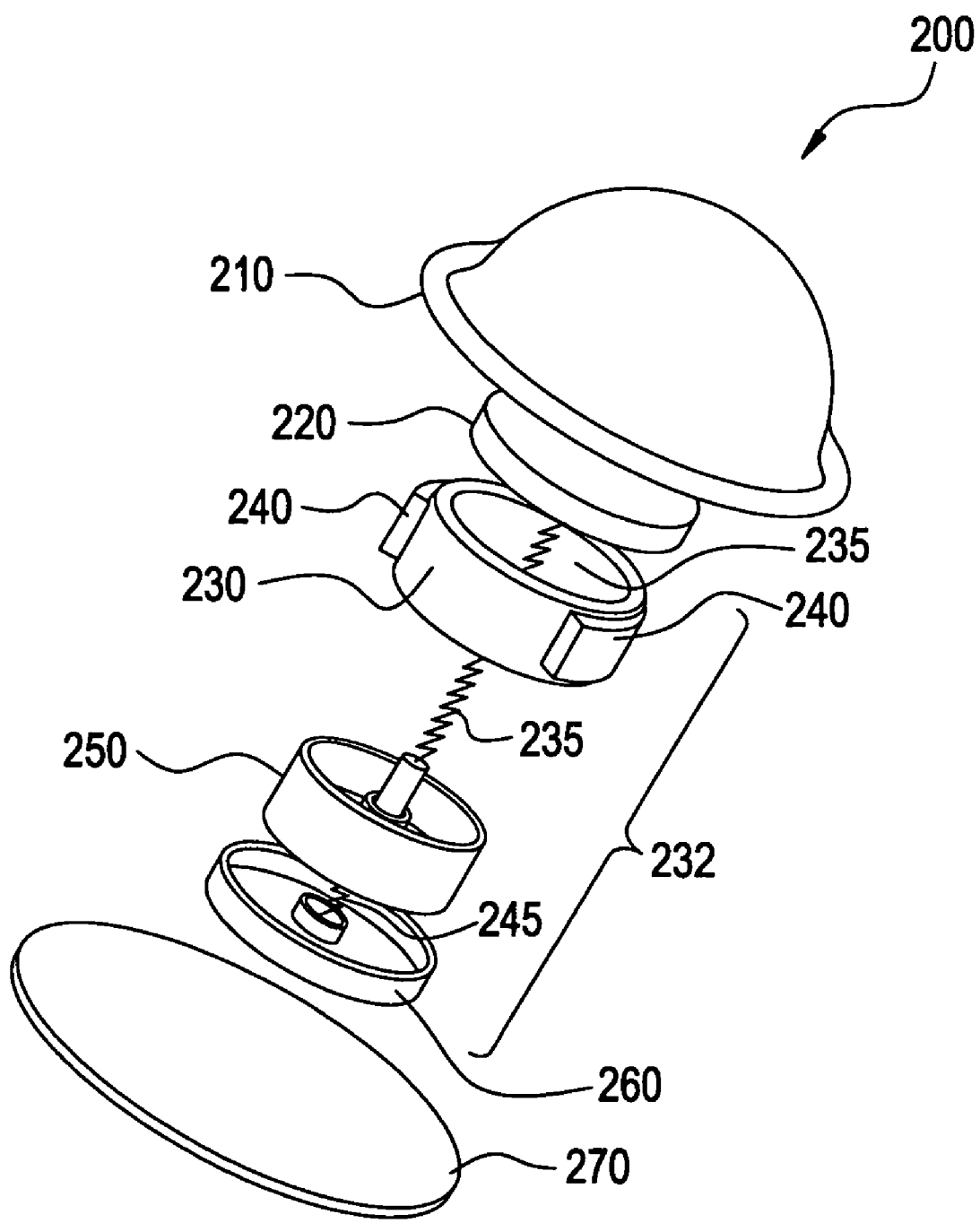

FIGS. 2A and 2B illustrate a vibration mitigation device (VMD) according to an exemplary embodiment of the present invention. FIG. 2A is a cross-sectional view of the VMD 200, and FIG. 2B is an exploded view. VMD 200 may be operatively attached or connected to a reactor component within the BWR such as a component of the steam dryer assembly 30. As shown, the VMD 200 may include an acoustic shield 210. The acoustic shield 210 may be comprised of stainless steel and/or any other material suitable for an environment of the BWR. The acoustic shield 210 may be provided to reduce vortexes which may excite an acoustic room mode.

For example, acoustic shield 210 may be configured to provide a relatively smooth steam flow across the VMD 200. A smooth steam flow may help to avoid and/or possibly prevent excitation of acoustic room modes, which may also be referred to as acoustic cavity modes, in the steam plenum of the steam dryer assembly 30, which may be in the vicinity of the component the VMD 200 is attached to, such as a component surface 30A of a steam dryer assembly 30, as shown in FIG. 2A.

An acoustic room mode is an acoustic standing wave pattern. Acoustic room modes may be excited when a vortex crosses the mouth of a cavity at a frequency that is close to an acoustic frequency. A vortex may be created when a boundary layer of a fluid in contact with a structure passes across the cavity. A portion of the fluid in contact with the structure may move slower than a portion of the fluid not in contact with the structure. The difference in the velocity between the portions may create circulation which becomes the vortex. When the vortex crosses the mouth of the cavity, an acoustic room mode may be excited. The excited acoustic room mode may increase the vibration energy in the component. Accordingly, acoustic shield 210 may facilitate a relatively smooth steam flow across the VMD 200 so as to avoid and/or possibly prevent excitation of the aforementioned acoustic room modes in the component to which the VMD 200 is attached.

VMD 200 may include a top end cap 220 and a bottom end cap 260. Caps 220 and 260 may provide a structure to which a spring mechanism 232 may be attached. A base plate 270 may provide support for the VMD 200 and may be attached to or secured on the steam dryer, such as at component surface 30A, for example. Caps 220, 260 and base plate 270 may be comprised of stainless steel and/or any other material suitable for an environment of the BWR, for example.

VMD 200 may further include a cylinder 230 with adjacent permanent magnets 240. The cylinder 230 may be either conductive or nonconductive. The permanent magnets 240 may be comprised of Alnico, Samarium Cobalt, Ceramic, and/or any other magnetic material, for example. The spring mechanism 232 may be embodied as coil springs, and/or may include a spring force provided by cantilever beams attached to a conductive core 250. The conductive core 250 may be comprised of steel, copper and/or any material having electrically conductive properties.

In an example, cylinder 230 may be stationary with respect to the acoustic shield 210, the top end cap 220, the bottom end cap 260, the adjacent permanent magnets 240, and the base plate 270 of the VMD 200. Alternatively, the conductive core 250 may oscillate with the spring mechanism 232. The spring mechanism 232 may be attached such that a first spring 235 is connected from the conductive core 250 to the top end cap 220, and a second spring 245 is connected from the conductive core 250 to the bottom end cap 260.

For example, the conductive core 250 may oscillate with the spring mechanism with respect to the cylinder 230 with adjacent magnets 240, in such a way that eddy currents are induced in the conductive core 250. Eddy currents are created when a conductor moves within a magnetic field. This relative motion may induce a voltage in an electrical conductor. The induced voltage is proportional to an induced current, which is the eddy current. A material resistance of the conductive core 250 may convert the eddy currents into heat. Heat is created when current passes through an object with material resistance.

Thus, the eddy currents in the conductive core 250 create a magnetic field which acts as a resistance to the oscillatory motion of the conductive core 250. This resistance may thus reduce the potential vibration effects induced by the component(s) to which the VMD 200 is connected.

Figure 3:
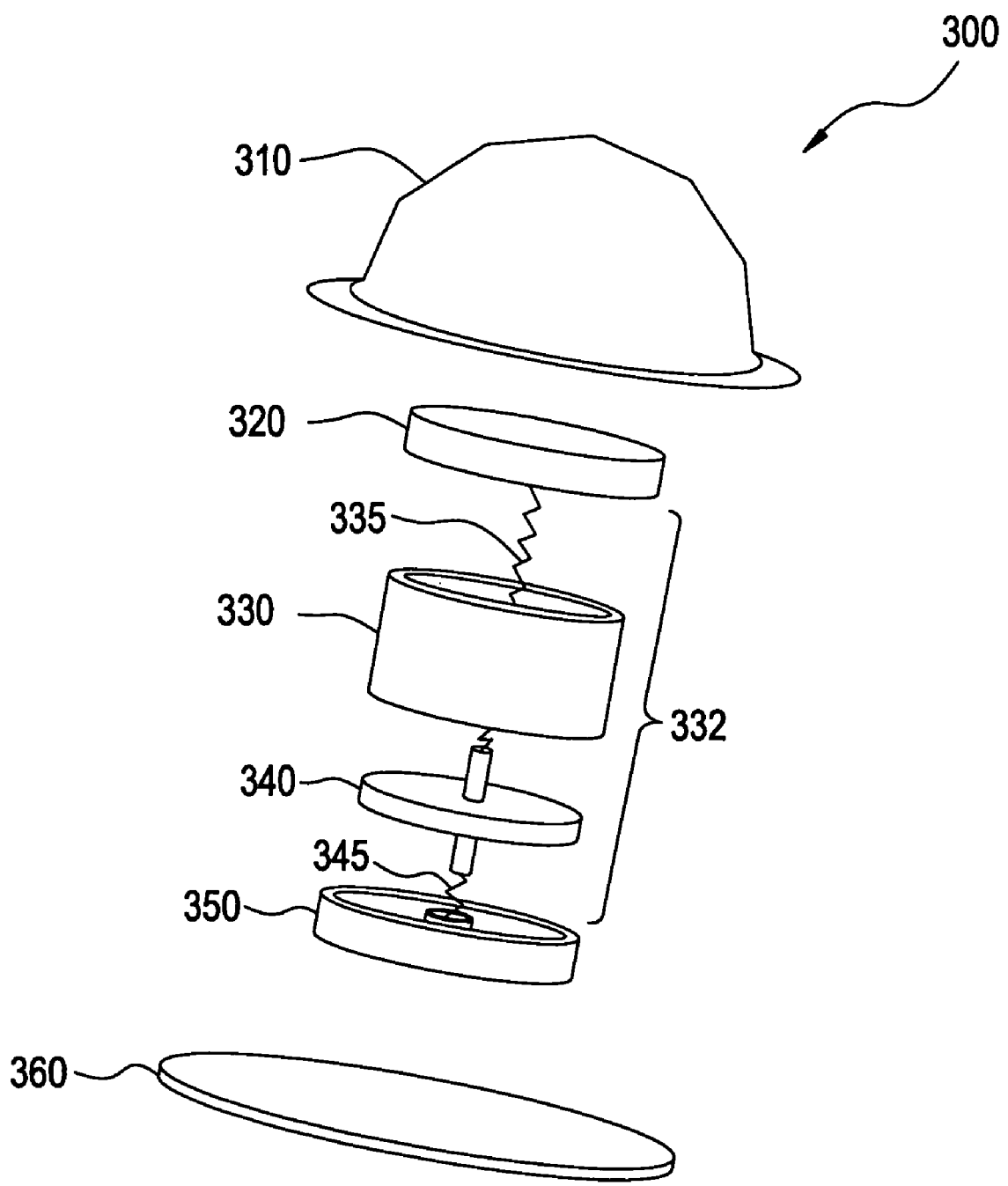
FIG. 3 illustrates a VMD according to another exemplary embodiment of the present invention.

FIG. 3 illustrates a VMD according to another exemplary embodiment of the present invention. Several of the components are somewhat similar in nature to FIG. 2. For example, VMD 300 may include an acoustic shield 310 of stainless steel and/or any other material suitable for an environment of the BWR. The acoustic shield 310 is provided to reduce vortexes which may excite an acoustic room mode, as described above.

VMD 300 may include a top end cap 320 and a bottom end cap 350 to which a spring mechanism 332 may be attached. A base plate 360 of stainless steel and/or any other material suitable for an environment of the BWR may provide support for the VMD 300 and may be attached to or secured on the steam dryer. The spring mechanism 332 may be embodied as coil springs, and/or may include a spring force provided by cantilever beams attached to a magnetic core 340. The magnetic core 340 may be comprised of Alnico, Samarium Cobalt, Ceramic, and/or any other magnetic material, for example.

The conductive cylinder 330 may be stationary with respect to the acoustic shield 310, the top end cap 320, the bottom end cap 350, and the base plate 360 of the VMD 300. The conductive cylinder 330 may be comprised of steel, copper and/or any other material having electrically conductive properties. Alternatively, the magnetic core 340 may oscillate with the spring mechanism 332. The spring mechanism 332 may be attached such that a first spring 335 is connected from the magnetic core 340 to the top end cap 320, and a second spring 345 is connected from the magnetic core 340 to the bottom end cap 350.

The magnetic core 340 may oscillate with the spring mechanism with respect to the conductive cylinder 330 such that eddy currents are induced in the conductive cylinder 330. The material resistance of the conductive cylinder 330 may convert the eddy currents into heat, as described above. The eddy currents in the conductive cylinder 330 may create a magnetic field which may act to resist the oscillatory motion of the magnetic core 340, thereby reducing the potential vibration effects induced by the component(s) to which the VMD 300 is connected.

A system designer may modify one, several and/or all of the physical dimensions of the constituent components of the VMD 200/300, in an effort to obtain a desired result. For example, increasing the magnetic flux of the permanent magnets 240 (or magnetic core 340) may decrease the amplitude of the frequency response by increasing the damping factor, while reducing the magnetic flux of the permanent magnets 240/magnetic core 340 may increase the amplitude of the frequency response by decreasing the damping factor. In another example, increasing the distance between the permanent magnets 240 and the conductive core 250 (or magnetic core 340 and conductive cylinder 330) may increase the amplitude of the frequency response by decreasing the damping factor. Decreasing this distance may reduce the amplitude of the frequency response by increasing the damping factor.

In another example, increasing the mass of the conductive core 250 (or conductive cylinder 330) may increase the frequency difference between the new damped natural frequencies, while decreasing the mass of the conductive core 250/cylinder 330 may decrease the frequency difference between the new damped natural frequencies. In another example, changing the stiffness of the spring mechanism 232 or 332 may change the magnitude of newly created damped natural frequencies.

In accordance with the exemplary embodiments, two new damped natural frequencies may be induced by the VMD 200/300, in place of an original natural frequency. The spring mechanisms attached to VMD 200/300 may induce the two new damped natural frequencies. One of the new damped natural frequencies may have a frequency which is lower than the original natural frequency, and the other may have a frequency which is higher than the original natural frequency. Further, each of the two new damped natural frequencies may have an amplitude lower than an amplitude of the original natural frequency. Therefore, as the VMD 200/300 provides amplitude reduction of the original natural frequency with damping, and the two new damped natural frequencies have amplitudes lower than the original natural frequency, the maximum amplitude of the frequency response may be reduced for a component configured with the VMD 200/300.

Figure 4:
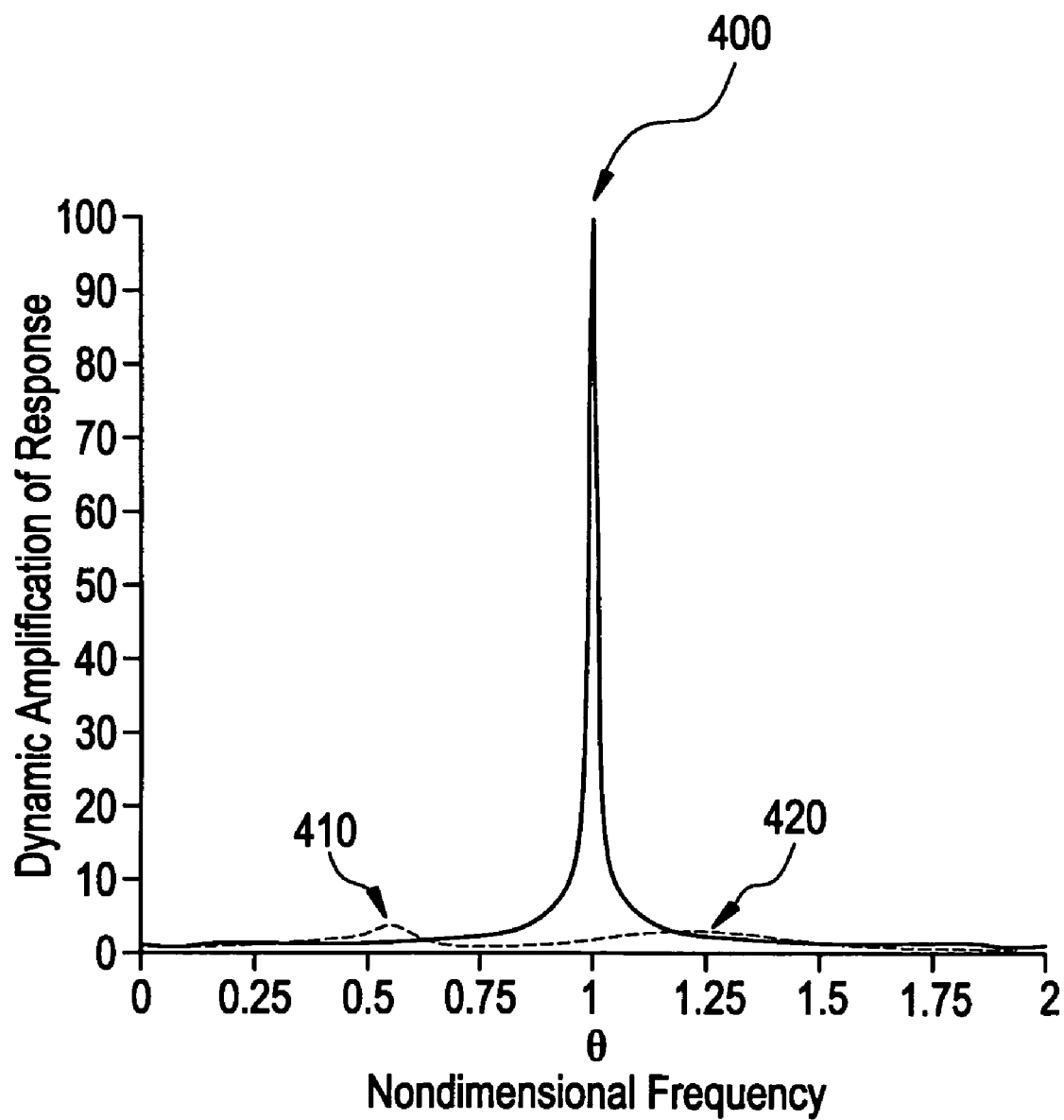
FIG. 4 is a graph for comparing an original natural frequency with damped natural frequencies introduced by the exemplary embodiments of the present invention.

FIG. 4 is a graph for comparing an original natural frequency with damped natural frequencies introduced by the exemplary embodiments of the present invention. The graph shows the dynamic amplification of the system response as a function of the non-dimensional frequency. This graph represents the vibration frequency response of a nuclear reactor component with and without the inclusion of a VMD.

As shown in FIG. 4, the original natural frequency 400 has a peak which reaches the top of the scaled x-axis at a frequency represented by "1" on the y-axis. In contrast, the peaks of the two damped natural frequencies 410 and 420 introduced by application of VMD 200/300 to a reactor component may occur at frequencies both above and below the original natural frequency, and further at reduced amplitudes, as compared to the amplitude of the original natural frequency 400. Therefore, the amplitude of the original natural frequency 400 has been reduced with damping, and the two new damped natural frequencies 410 and 420 have amplitudes lower than the original natural frequency 400, so the maximum amplitude of the frequency response has been reduced for a component with the VMD 200/300. The dynamic amplification of each natural frequency and the non-dimensional frequency at which the maximum amplification occurs are functions of the values chosen for the specific design parameters such as magnetic field strength, mass, stiffness, gap, etc.

Figure 1:
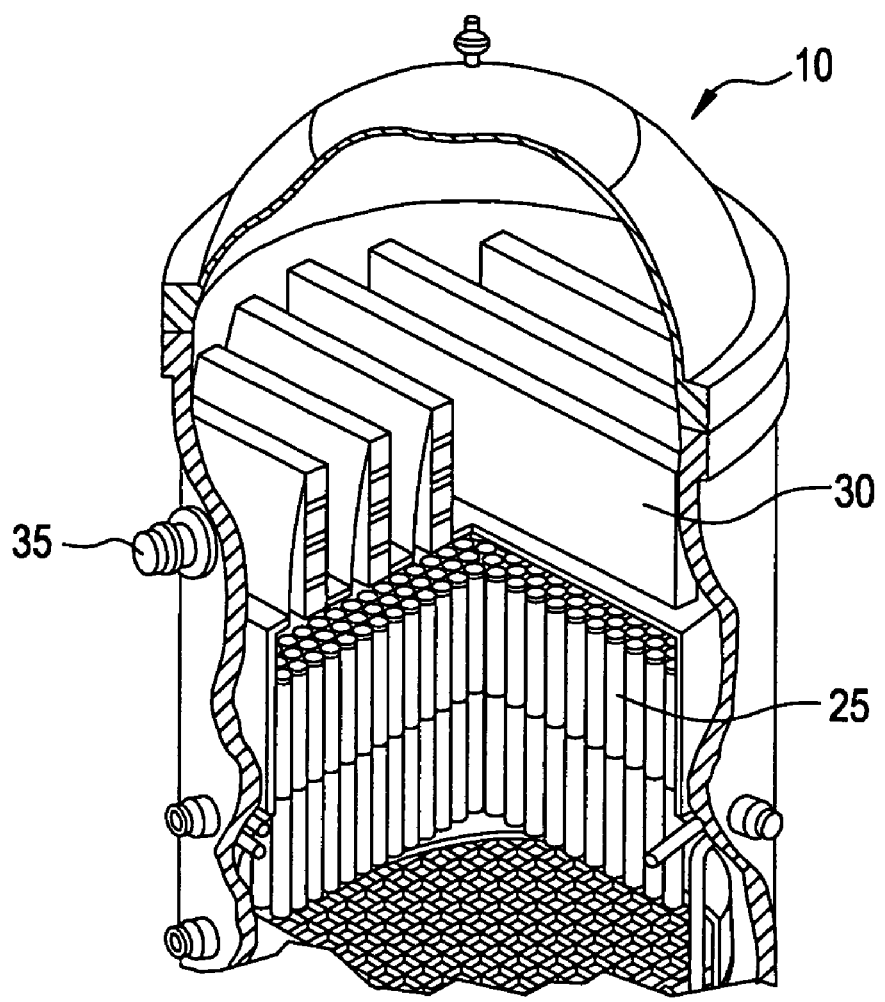
FIG. 1 is a cut-away to illustrate an upper portion of a conventional reactor pressure vessel (RPV) of a BWR.

The exemplary embodiments of the present invention being thus described, it will be obvious that the same may be varied in many ways. For example, the VMD may be applied to reactor components other than the steam dryer assembly, such as a jet pump assembly, for example. With respect to FIG. 1, the jet pump assembly may be attached to the BWR with a riser brace. The riser brace may experience cracking similar to the steam dryer assembly. The VMD described above may be similarly attached to a riser brace supporting a jet pump assembly in an effort to prevent cracking. The VMD 200/300 may also be applicable to any system which utilizes a tuned mass damper (TMD), for example. Such variations are not to be regarded as a departure from the spirit and scope of the exemplary embodiments of the invention, and all such modifications as would be obvious to one skilled in the art are intended to be included within the scope of the following claims.

I claim:

1. A method of reducing vibration in a component within a nuclear reactor, comprising:
   providing a passive vibration mitigating device that does not require a supply of electrical power in order to operate and mitigate vibration, the device configured to attach to the component, the device including,
      a cylindrical body including a lateral surface and first and second ends,
      at least one permanent magnet directly attached to the lateral surface of the cylindrical body, between the first and second ends,
      a spring mechanism directly attached to the first and second ends of the cylindrical body, and
      a conductive core directly attached to the first and second ends of the cylindrical body by the spring mechanism, the conductive core disposed laterally of the permanent magnet and configured to oscillate on the spring mechanism,
      wherein the conductive core is disposed entirely within the cylindrical body;
   attaching the device to the component;
   allowing the conductive core to oscillate on the spring mechanism, to induce eddy currents in the conductive core and create a magnetic field, the magnetic field causing resistance to the oscillation of the conductive core; and
   altering vibration characteristics of the component by lowering an amplitude of a natural frequency of the component due to the resistance to the oscillation of the conductive core.

2. The method of claim 1, wherein the component of the attaching step is a component in a boiling water reactor steam dryer.

3. The method of claim 1, wherein the providing step provides the device including an acoustic shield for the device, wherein the cylindrical body is disposed beneath the acoustic shield.

4. The method of claim 3, wherein the providing step provides the acoustic shield to completely cover the cylindrical body.

5. The method of claim 1, wherein the providing step provides the device where the at least one permanent magnet and the cylindrical body are stationary relative to each other, and the conductive core is configured to oscillate relative to the stationary permanent magnet and the cylindrical body while in use.

6. A method of reducing vibration in a component within a nuclear reactor, comprising:
   providing a device including a cylindrical body and a permanent magnet, the cylindrical body including a lateral surface and first and second ends, the permanent magnet being directly attached to the lateral surface of the cylindrical body between the first and second ends;
   attaching the device to the component;
   oscillating a conductive core on a spring mechanism to produce eddy currents and a magnetic field between the conductive core and the permanent magnet, the spring mechanism directly attached to the first and second ends of the cylindrical body, the conductive core disposed entirely within the cylindrical body, wherein the eddy current and the magnetic field are formed solely from the oscillating of the conductive core without supplying electrical power to the device; and
   altering vibration characteristics of the component, by lowering an amplitude of a natural frequency of the component due to the resistance to the oscillation of the conductive core caused by the magnetic field.

7. The method of claim 6, wherein the oscillating step includes the conductive core converting the induced eddy currents into heat.

8. The method of claim 6, wherein the providing step provides the device including an acoustic shield for the device, wherein the cylindrical body is disposed beneath the acoustic shield.

9. The method of claim 8, wherein the providing step provides the acoustic shield to completely cover the cylindrical body.

10. The method of claim 6, wherein the providing step provides the device where the at least one permanent magnet and the cylindrical body are stationary relative to each other, and the conductive core is configured to oscillate relative to the stationary permanent magnet and the cylindrical body while in use.

* * * * *